(12) United States Patent
Bertolini

(10) Patent No.: US 9,534,871 B2
(45) Date of Patent: Jan. 3, 2017

(54) BULLETPROOF WINDOW

(71) Applicant: ISOCLIMA S.P.A., Este (IT)

(72) Inventor: Alberto Bertolini, Este (IT)

(73) Assignee: ISOCLIMA S.P.A., Este (IT)

( * ) Notice: Subject to any disclaimer, the term of this patent is extended or adjusted under 35 U.S.C. 154(b) by 670 days.

(21) Appl. No.: 13/959,190

(22) Filed: Aug. 5, 2013

(65) Prior Publication Data

US 2014/0060306 A1   Mar. 6, 2014

(30) Foreign Application Priority Data

Sep. 4, 2012 (EP) .................................... 12006237

(51) Int. Cl.
| | |
|---|---|
| *F41H 5/00* | (2006.01) |
| *F41H 5/04* | (2006.01) |
| *F41H 5/26* | (2006.01) |
| *F41H 7/00* | (2006.01) |
| *B32B 17/10* | (2006.01) |

(52) U.S. Cl.
CPC ......... *F41H 5/0407* (2013.01); *B32B 17/1077* (2013.01); *B32B 17/10293* (2013.01); *B32B 17/10761* (2013.01); *B32B 17/10788* (2013.01); *F41H 5/0421* (2013.01); *F41H 5/0428* (2013.01); *F41H 5/263* (2013.01); *F41H 7/00* (2013.01)

(58) Field of Classification Search
USPC ........ 89/36.01, 36.02, 36.07, 36.09; 428/911
See application file for complete search history.

(56) References Cited

U.S. PATENT DOCUMENTS

| | | |
|---|---|---|
| 6,280,826 B1 | 8/2001 | Woll et al. |
| 6,708,595 B1 | 3/2004 | Chaussade et al. |
| 2008/0032104 A1 | 2/2008 | Mannheim Astete et al. |
| 2010/0132540 A1 | 6/2010 | Mandelartz et al. |

FOREIGN PATENT DOCUMENTS

| | | |
|---|---|---|
| EP | 1010963 B1 | 11/2004 |
| WO | 0053410 A1 | 9/2000 |

*Primary Examiner* — J. Wooodrow Eldred
(74) *Attorney, Agent, or Firm* — Hauptman Ham, LLP

(57) ABSTRACT

The present invention refers to a bulletproof window, in particular for use as a window of a motor vehicle or car, comprising at least one outer pane, at least one inner pane, one or more middle panes arranged between the outer pane and the inner pane, adhesive layers each between respective two panes in a laminate, the outer pane protrudes over the other panes on a peripheral edge of the bulletproof window and the inner pane protrudes over the one or more middle panes on the peripheral edge of the bulletproof window, and a bullet resistant, rigid reinforcement covering at least a part of an inner side of the outer pane at the peripheral edge of bulletproof window, being arranged at least partly between the outer pane and the following middle pane in the extension of an adhesive layer, and being fitted to the inner side of the outer pane.

16 Claims, 1 Drawing Sheet

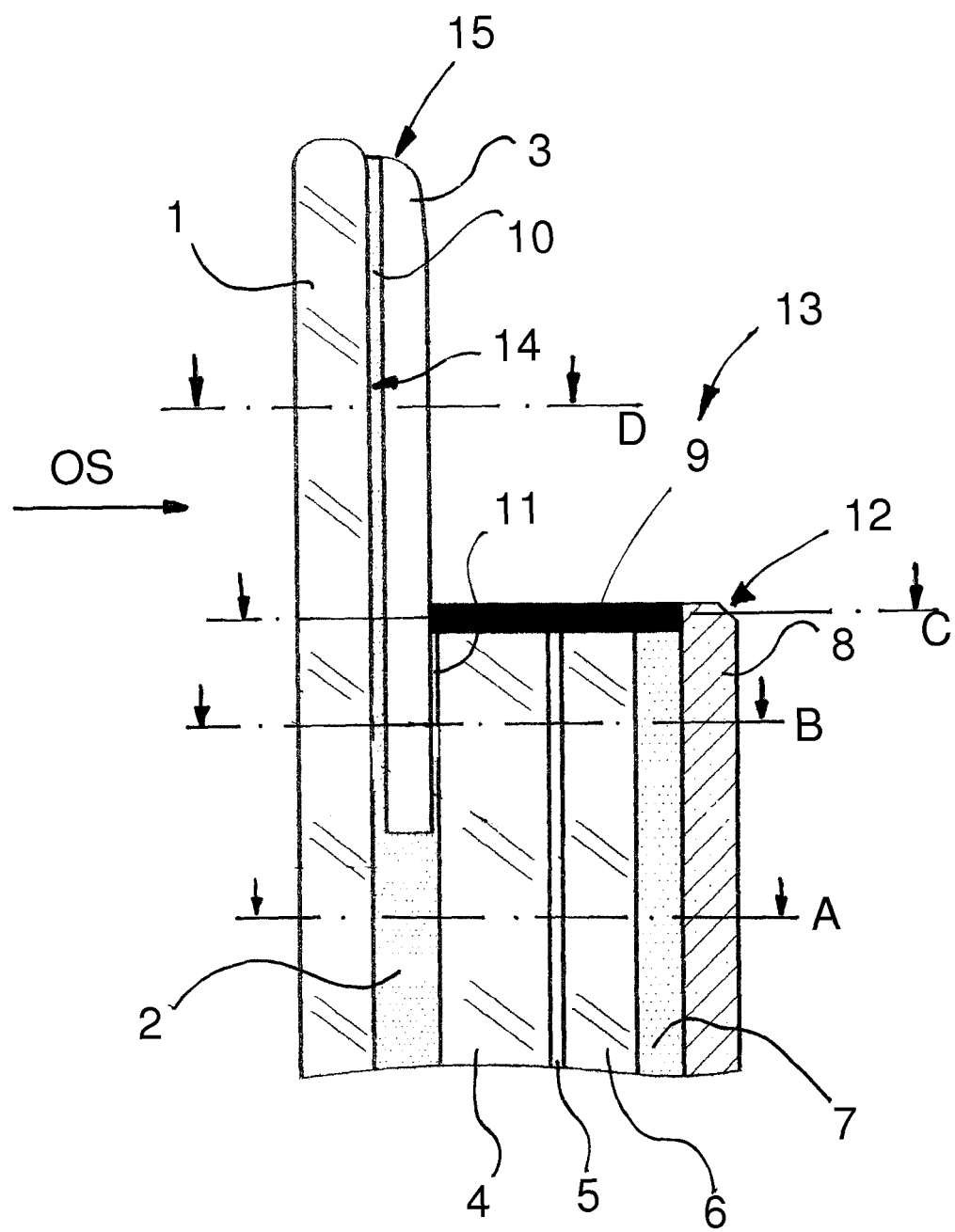

BULLETPROOF WINDOW

RELATED APPLICATIONS

The present application is based on, and claims priority from, European Application No. 12006237.7, filed Sep. 4, 2012, the disclosure of which is hereby incorporated by reference herein in its entirety.

The present invention relates to a bulletproof window, in particular for use as a window of a motor vehicle or car, with a laminated structure of panes and adhesive layers and with reinforcement or metal armouring on the edge of the bulletproof window.

EP 1 010 963 B1 describes a known bulletproof glass window, in particular for use as a lowerable side window of a motor vehicle, with several glass panes in a sandwich structure, e.g. made of bulletproof glass and composite material, at least one layer of composite material being positioned between two adjoining glass panes, in order to join the two panes, a grading or stepped portion formed at the edge of the bulletproof glass window and having a projection to enable the bulletproof glass window to lodge or engage into a chassis or door frame, and a reinforcement or metal armouring that covers at least an inner surface of the projection.

In case of a strong and adverse shooting at the edge of the window, the problem can arise that the reinforcement can be shifted or deformed which would result in splinters from the edge of the neighbouring glass panes entering inside the car.

The object of the present invention is to stop these splinters to enter inside of the vehicle.

This problem is solved by the bulletproof window or pane of the invention according to claim 1. Accordingly, the bulletproof window or bullet resistant pane of the present invention, in particular for use as a window of a motor vehicle or car, comprises at least one outer pane, at least one inner pane, one or more middle panes arranged between the outer pane and the inner pane, and adhesive layers each between respective two panes in a laminate. The outer pane of the window of the present invention protrudes over the other panes on a peripheral edge of the bulletproof window and the inner pane protrudes over the one or more middle panes on the peripheral edge of the bulletproof window. Further, the window of the present invention comprises a bullet resistant, rigid reinforcement covering at least a part of an inner side of the outer pane at the peripheral edge of bulletproof window, being arranged at least partly between the outer pane and the following middle pane in the extension of an adhesive layer, and being fitted to the inner side of the outer pane.

The bulletproof window of the invention has the advantage to improve the protection of the passengers in a car. First, in the case of an adverse shooting from outside onto the edge of the bulletproof window, the reinforcement integrated in the glass structure stops the bullet and reduces its kinetic energy. However, this can result in a deformation of the edge reinforcement that could lead to a spalling of glass splinters from an edge of the following middle glass panes. But according to the invention, these splinters are stopped by means of the inner pane or its protrusion protruding over the edge of the middle glass panes. Finally, the present invention prevents splinters to enter inside the car and, therefore, the passengers within the vehicle are protected reliable by the window of the present invention.

The panes of the invention can each be made of glass, ceramic, polycarbonate, glass ceramic, spinel, AlON (Aluminiumoxynitrid), Poly(methyl methacrylate), or urethane in order to be able to adapt the window to the specific requirements of, for instance, weight, bullet resistance or given design of vehicle body.

Preferably, the inner pane is made of polycarbonate to attain outstanding splinter stopping and repression characteristics.

The reinforcement can be arranged in the extension or continuation of an adhesive layer made of polyurethane (PU), polyvinylbutyral (PVB), ionomers, or EVA wherein polyurethane is preferred since its long term stability in laminating the adjoining surfaces of the panes and reinforcement.

The adhesive layers of the window of the present invention can be made of polyurethane (PU), polyvinylbutyral (PVB), ionomers, or ethylene vinyl acetate (EVA).

In a preferred embodiment, the adhesive layer for fitting the reinforcement to the outer pane is made of polyurethane in order to ensure long term stability of the window glazing.

Preferably, the adhesive polyurethane layer between the outer pane and the following middle pane underneath the reinforcement is a homogenous layer or comprises a laminate made of several polyurethane layers to ensure long time stability of the laminate and to facilitate production depending on measures or thickness of the edge reinforcement.

The reinforcement can be made of ballistic steel or it comprises a composite material like aramidic, carbon, glass or polyethylene fibers or a mixing of said fibers combined with resins.

The reinforcement can be designed as a flat strip, a flat circumferential frame, or frame section on the edge of the bulletproof window and it is made of ballistic steel to facilitate the production of the window and to ensure its resistance against bullets, respectively. The reinforcement can consist of several parts forming the frame.

An adhesive layer can be made of polyurethane between the reinforcement and an adjoining middle pane to ensure long term stability of the bulletproof window. Further, the adhesive layer can be made of polyurethane between the reinforcement and the outer pane to ensure a good lamination with long term stability. Also the adhesive layer between the inner pane made of polycarbonate and the adjoining middle pane can be made of polyurethane for reasons of good lamination.

Preferably, a sealant layer covers the edge faces of the one or more middle panes and the corresponding adhesive layers between the reinforcement and the inner pane made of polycarbonate on the edge of the bulletproof window to improve the resistance of the window against splinters from the middle glass panes. The sealant layer can be flush to an edge of the inner polycarbonate pane.

Preferably, the bulletproof window according to the present invention has the following structure to optimise its protecting characteristics:

in a cross section plane seen underneath a strip like reinforcement made of ballistic steel, the following laminate of panes and layers, from the outer side to the inner side of the bulletproof window:

outer glass pane, polyurethane layer, first middle glass pane, polyurethane layer, second middle glass pane, polyurethane layer, polycarbonate pane;

in a cross section plane seen underneath a sealant layer, the following laminate of panes and adhesive layers, from the outer side to the inner side of the bulletproof window:

outer glass pane, polyurethane layer, bullet resistant reinforcement, polyurethane layer, first middle glass pane, polyurethane layer, second middle glass pane, polyurethane layer polycarbonate pane;

in a cross section plane through the sealant layer, the following laminate from the outer side to the inner side of the bulletproof window:

outer glass pane, polyurethane layer, bullet resistant reinforcement, sealant layer, polycarbonate pane; and in a cross section plane seen above the sealant layer, the following laminate from the outer side to the inner side of the bulletproof window:

outer glass pane, polyurethane layer, bullet resistant reinforcement.

Further advantageous embodiments of the present invention are mentioned in the dependent claims.

Further advantages, advantageous embodiments and possibilities of application of the present invention are provided in the following description of a preferred embodiment of the subject matter of the invention in connection with the single drawing.

FIG. 1 shows as the only drawing a partial cross section view of a preferred embodiment of the bulletproof window of the invention at its peripheral edge.

FIG. 1 shows a preferred embodiment of the transparent bulletproof window according to the invention that is formed as laminated glazing and it comprises several glass panes 1, 4, and 6, an inner polycarbonate pane 8, and a bullet resistant rigid reinforcement 3 or insert. The embodiment of FIG. 1 can be used as a lowerable bulletproof side window of a motor vehicle.

The inner polycarbonate pane 8 is positioned towards the interior of the motor vehicle, the outer glass pane 1 being positioned towards the exterior of the motor vehicle, and the middle glass panes 4 and 6 being positioned between the outer glass pane 1 and the inner polycarbonate pane 8.

The exterior of the motor vehicle is marked by means of arrow OS in FIG. 1, the arrow pointing at the outer glass pane 1. An adhesive layer of polyurethane 2 extends between the outer glass pane 1 and the following middle glass pane 4, and forms a compound or composite between the outer glass pane 1 and the middle glass pane 4.

There is an additional adhesive layer or foil of polyurethane 5 between the middle glass pane 4 and the further middle glass pane 6 that also establishes a firm composite between the middle glass panes 4 and 6. The layer of polyurethane 5 is identical in area with the adjoining surfaces of the middle glass panes 4 and 6.

The outer glass pane 1 protrudes over the middle glass panes 4 and 6 and the inner polycarbonate pane 8 on the edge of the bulletproof window shown in FIG. 1. The peripheral reinforcement 3, made for example of ballistic sheet steel, is mounted on the inner side 14 of the inner glass pane 1 by means of an adhesive layer 10 made of polyurethane on the edge 13 of the bulletproof window. The reinforcement 3 has a cross section substantially rectangular. A projection 15 or protrusion comprising the protruding part of the outer glass pane 1, a protruding part of the reinforcement 3, and a protruding part of the adhesive layer 10 is used to be held in a frame or recess on the motor vehicle if the bulletproof window is in a closed position. The middle panes 4 and 6, the adhesive layer 5, and the adhesive layer 11 made of polyurethane between the reinforcement 3 and the following middle glass pane 4 are flush to each other on the edge 13 of the bulletproof window.

The inner polycarbonate pane 8 protrudes over the middle glass panes 4 and 6 on the edge 13 of the bulletproof window to avoid that glass splinters can enter the inside of the vehicle in the case of shooting bullets from the outside OS onto the bulletproof window. A further adhesive layer 7 made of polyurethane is arranged between the middle glass pane 6 and the inner polycarbonate pane 8. The adhesive layer is flush to the middle glass panes 4 and 6. A peripheral sealant layer 9 made of polyurethane is arranged on the edge 13 of the bulletproof window and it covers the flush faces of the middle glass panes 4 and 6, and of the adhesive polyurethane layers 11, 5, and 7 between the strip like reinforcement 3 and the inner polycarbonate pane 8. The faces of the sealant layer 9 and the inner polycarbonate pane 8 are flush. The polycarbonate pane 8 has a bevel 12 on its inner edge.

In an exemplified bulletproof window of the invention, the thickness of the outer glass pane 1 can be in the range of 4 mm to 8 mm, and it is preferably 7 mm. The middle glass panes 4 and 5 can be each in the range of 4 to 12 mm, and they are preferably 11 mm and 7 mm, respectively, thick. The thickness of the inner polycarbonate pane 8 is 5 mm. The thickness of each of the polyurethane layers 10, 5, and 11 can be in the range of 0,2 to 2,5 mm. The ballistic steel reinforcement 3 is approximately 5 mm and its length amounts to ca. 67 mm wherein ca. 20 mm thereof is integrated in the glass between the outer glass pane 1 and the following middle glass pane 4. the ballistic steel reinforcement can be in the range of 1 to 6 mm thick. Its vertical length can amount to 150 mm. The complete thickness of the adhesive polyurethane layer 2 adjoining the reinforcement 3 amounts to ca. 6 mm, but it can be in the range from 0,4 mm to 5 mm plus the thickness of the reinforcement. And the thickness of the adhesive polyurethane layer 7 amounts to ca. 3,2 mm, but it can be in the range of 1,2 to 3,2 mm. The sealant layer 9 is ca. 3 mm thick, but it can be in the range of 0,38 to 10 mm. A protruding peripheral length of the polycarbonate pane 8 is 3 mm, but it can be in the range from 0,38 mm to 10 mm corresponding to the peripheral sealant layer 9.

The bulletproof window of FIG. 1 is represented by the following laminated structure:

in a cross section plane A seen underneath the strip like reinforcement 3 made of ballistic steel, the following laminate of panes and layers, from the outer side to the inner side of the bulletproof window:

outer glass pane 1, polyurethane layer 2, first middle glass pane 4, polyurethane layer 5, second middle glass pane 6, polyurethane layer 7, polycarbonate pane 8;

in a cross section plane B seen underneath the sealant layer 9, the following laminate of panes and adhesive layers, from the outer side to the inner side of the bulletproof window:

outer glass pane 1, polyurethane layer 10, bullet resistant reinforcement 3, polyurethane layer 11, first middle glass pane 4, polyurethane layer 5, second middle glass pane 6, polyurethane layer 7, polycarbonate pane 8;

in a cross section plane C through the sealant layer 9, the following laminate from the outer side to the inner side of the bulletproof window:

outer glass pane 1, polyurethane layer 10, bullet resistant reinforcement 3, sealant layer 9, polycarbonate pane 8; and in a cross section plane D seen above the sealant layer 9, the following laminate from the outer side to the inner side of the bulletproof window:

outer glass pane 1, polyurethane layer 10, bullet resistant reinforcement 3.

The invention claimed is:

1. A bulletproof window for a motor vehicle or car, the bulletproof window comprising:

a laminate of a plurality of panes and a plurality of adhesive layers; and
a bullet resistant, rigid reinforcement,
wherein
the plurality of panes comprises an outer pane, an inner pane, and one or more middle panes arranged between the outer pane and the inner pane,
each adhesive layer among the plurality of adhesive layers is arranged between respective two panes among the plurality of panes in the laminate,
the plurality of adhesive layers includes an outermost adhesive layer arranged between (i) the outer pane and (ii) an adjoining middle pane, and
on a peripheral edge of the bulletproof window,
the outer pane has a protruding part which protrudes beyond the inner pane and the one or more middle panes,
the inner pane protrudes beyond the one or more middle panes, and
the bullet resistant, rigid reinforcement covers a part of an inner side of the outer pane, has a portion arranged in the outermost adhesive layer and between the outer pane and the adjoining middle pane, and is bonded to the inner side of the outer pane by the outermost adhesive layer.

2. The bulletproof window according to claim 1, wherein each of the plurality of panes is made of one selected from the group consisting of glass, ceramic, polycarbonate, glass ceramic, spinel, AlON, Poly(methyl methacrylate), and urethane.

3. The bulletproof window according to claim 1, wherein the inner pane is made of polycarbonate.

4. The bulletproof window according to claim 1, wherein
the outermost adhesive layer has an extension arranged between the reinforcement and the protruding part of the outer pane, and
the extension of the outermost adhesive layer is made of one selected from the group consisting of polyurethane (PU), polyvinylbutyral (PVB), ionomers, and ethylene vinyl acetate (EVA).

5. The bulletproof window according to claim 1, wherein each of the plurality of adhesive layers is made of one selected from the group consisting of polyurethane (PU), polyvinylbutyral (PVB), ionomers, and ethylene vinyl acetate (EVA).

6. The bulletproof window according to claim 1, wherein the outermost adhesive layer is made of polyurethane.

7. The bulletproof window according to claim 6, wherein the outermost adhesive polyurethane layer between the outer pane and the adjoining middle pane underneath the reinforcement is a homogenous layer or comprises a laminate of several polyurethane layers.

8. The bulletproof window according to claim 1, wherein the reinforcement is one selected from the group consisting of a flat strip, a flat circumferential frame, and a frame section on the peripheral edge of the bulletproof window.

9. The bulletproof window according to claim 1, wherein the reinforcement
is made of ballistic steel, or
comprises a composite material selected from the group consisting of aramidic, carbon, glass and polyethylene fibers.

10. The bulletproof window according to claim 1, wherein the outermost adhesive layer is made of polyurethane between the reinforcement and the adjoining middle pane.

11. The bulletproof window according to claim 1, wherein the outermost adhesive layer is made of polyurethane between the reinforcement and the outer pane.

12. The bulletproof window according to claim 1, wherein
the inner pane is made of polycarbonate,
an adjoining middle pane adjoining the inner pane is made of glass, and
an adhesive layer between the inner pane and the adjoining middle pane is made of polyurethane.

13. The bulletproof window according to claim 1, further comprising:
a sealant layer covering edge faces of the one or more middle panes and the corresponding adhesive layers,
wherein
the inner pane is made of polycarbonate, and
said sealant layer extends between the reinforcement and the inner pane made of polycarbonate on the peripheral edge of the bulletproof window.

14. The bulletproof window according to claim 13, wherein the sealant layer is flush to an edge of the inner polycarbonate pane.

15. A bulletproof window, comprising:
a laminate of a plurality of panes and a plurality of polyurethane layers;
a bullet resistant reinforcement made of ballistic steel; and
a sealant layer,
wherein
the plurality of panes comprises:
an outer glass pane,
an inner polycarbonate pane, and
first and second middle glass panes arranged between the outer glass pane and the inner polycarbonate pane;
the plurality of polyurethane layers comprises:
a first polyurethane layer between the outer glass pane and the first middle glass pane,
a second polyurethane layer between the first middle glass pane and the second middle glass pane, and
a third polyurethane layer between the second middle glass pane and the inner polycarbonate pane;
in a first cross section plane below a lower end of the reinforcement, the bulletproof window comprises, from an outer side to an inner side of the bulletproof window:
the outer glass pane, a first portion of the first polyurethane layer, the first middle glass pane, the second polyurethane layer, the second middle glass pane, the third polyurethane layer, and the inner polycarbonate pane;
in a second cross section plane below the sealant layer and above the lower end of the reinforcement, the bulletproof window comprises, from the outer side to the inner side of the bulletproof window:
the outer glass pane, a second portion of the first polyurethane layer, the bullet resistant reinforcement, a third portion of the first polyurethane layer, the first middle glass pane, the second polyurethane layer, the second middle glass pane, the third polyurethane layer, and the inner polycarbonate pane;
in a third cross section plane through the sealant layer, the bulletproof window comprises, from the outer side to the inner side of the bulletproof window:
the outer glass pane, the second portion of the first polyurethane layer, the bullet resistant reinforcement, the sealant layer, and the inner polycarbonate pane; and
in a fourth cross section plane above the sealant layer and below an upper end of the reinforcement, the bulletproof window comprises, from the outer side to the inner side of the bulletproof window:

the outer glass pane, the second portion of the first polyurethane layer, and the bullet resistant reinforcement.

16. The bulletproof window according to claim 15, wherein a thickness of the first portion of the first polyurethane layer is greater than a thickness of the reinforcement by 0,4 mm to 5 mm.

* * * * *